Nov. 3, 1931.　　　　A. F. FIFIELD　　　　1,830,600
VIBRATION DAMPING DEVICE
Filed May 27, 1927　　　　2 Sheets-Sheet 1
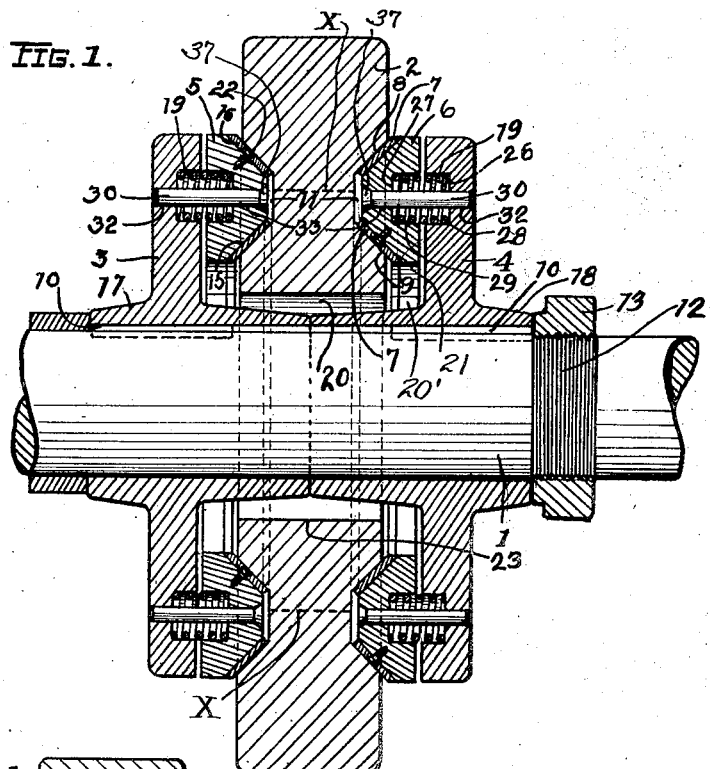
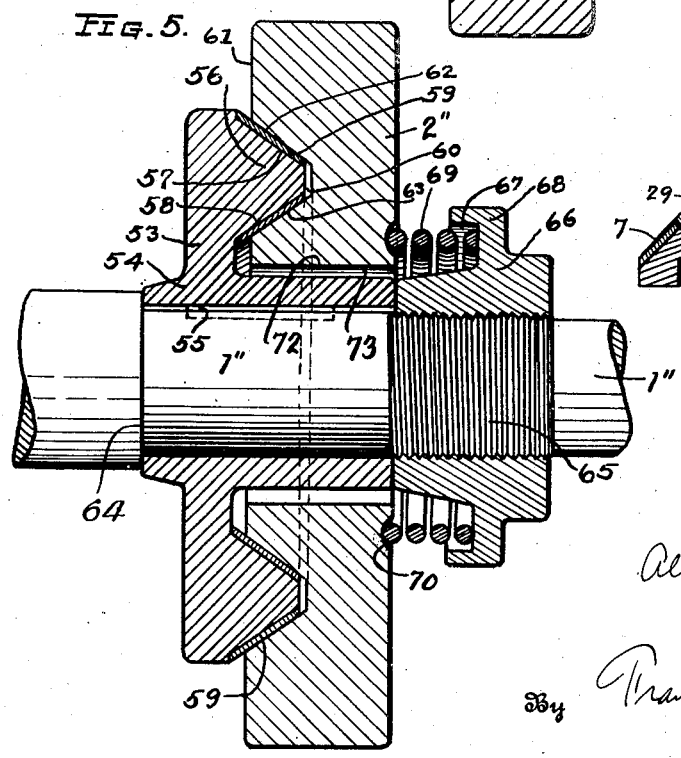
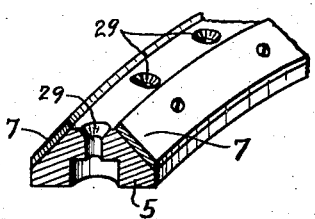
Albert F. Fifield, Inventor
By Frank M. Stough
His Attorney Nov. 3, 1931.  A. F. FIFIELD  1,830,600
VIBRATION DAMPING DEVICE
Filed May 27, 1927  2 Sheets-Sheet 2

Albert F. Fifield, Inventor
By Frank M. Slough
His Attorney

Patented Nov. 3, 1931

1,830,600

UNITED STATES PATENT OFFICE

ALBERT FRANK FIFIELD, OF ST. CATHARINES, ONTARIO, CANADA

VIBRATION DAMPING DEVICE

Application filed May 27, 1927. Serial No. 194,625.

This invention relates to vibration dampers for rotating shafts, and relates particularly to vibration dampers adaptable for use in connection with hydro-carbon motors.

One of the objects of the invention is to provide a vibration damping device of simple and practical construction and in which the wearing parts may be easily removed and replaced.

Another object of my invention is to provide a vibration damping device in which provision is had for the preventing of objectionable noises incidental to the rotation of the shaft equipped with said vibration damping device.

Another object of my invention is to provide a vibration damping device of such a character that wear occurring in use between relatively movable parts will be continuously automatically compensated for and without any appreciable loss in efficiency.

Other objects of my invention and the invention itself will become apparent by reference to the accompanying drawings illustrating certain specific embodiments thereof.

In the drawings:

Fig. 1 illustrates, in sectional view, an embodiment of my invention;

Fig. 2 is a perspective view of a section of one of the friction rings illustrated in the embodiment of Fig. 1;

Fig. 5 is a sectional view of still another embodiment of my invention.

Figure 4:
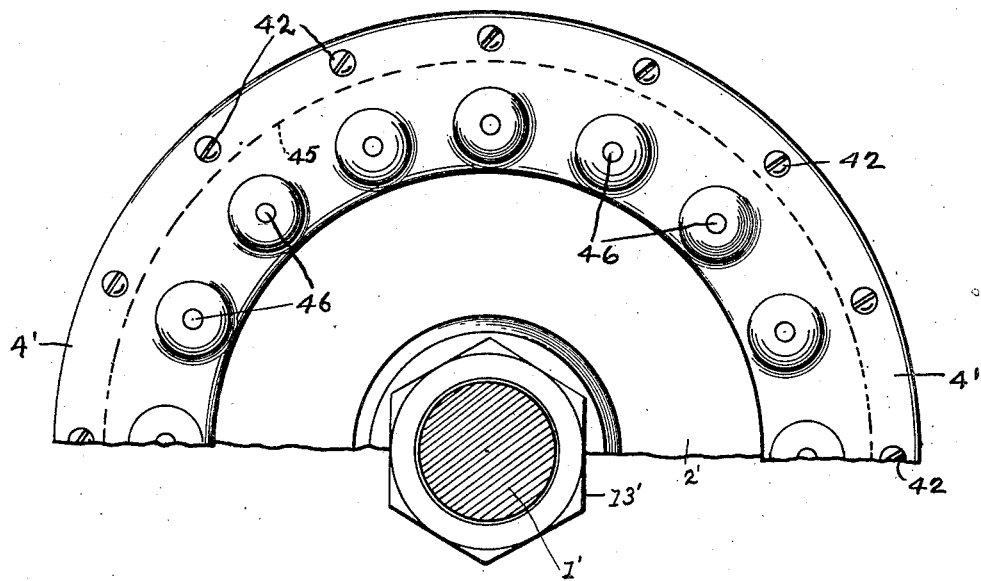
Fig. 4 is a front elevational view of one-half of the device shown in Fig. 3.

Referring now to the different figures of drawings, and, first, particularly to the embodiment of Figs. 1 and 2, at 1, I show a crankshaft of a hydro-carbon motor, preferably of the multi-cylinder type. The vibration damper illustrated herein is mounted upon, and preferably entirely supported by, the crankshaft and comprises, in the present embodiment, a heavy metallic ring 2 which may be called the "flywheel" part of the damper, and which, as illustrated, is telescoped over the end of the shaft 1 but held out of direct contact therewith by a pair of supporting disks 3 and 4 having supporting hubs 17 and 18 and having friction ring portions 5 and 6, respectively, each engaging by a pair of friction lining strips 7 with inclined surface portions 8 and 9, respectively, of the flywheel 2. The disks 3 and 4 are, as illustrated, rigidly secured to the shaft 1 having keys 10 locking them to the shaft to prevent relative rotation between the disk 3 and the crankshaft.

The flywheel 2 is at all times supported with the inner walls of its axial bore 23 out of contact with the outer surface of the crankshaft 1, there being a cylindrical clearance space 20 at all times between the flywheel and the crank shaft. The same is true for the bores 21 of the ring portions 5 and 6 whereby a clearance space 21 is provided between the shaft and the inner walls of the bores 21.

The ring portions 5 and 6 are spring-pressed against the inclined surfaces 8 and 9 of the annular grooves 11 on the outer side of the flywheel by means of a nut 13, engaging the disk 4. By removing the nut 13 which is screw-threaded at 12 onto the crankshaft, the flywheel 2 and disk 4 may be axially removed from the shaft and access is had to the friction rings for purposes of repair and attention to the friction elements therefor or for other purposes, as required. The nut 13 likewise affords a ready means of securing the parts in their operative positions in assembling the device on the shaft.

Frictional elements comprising friction facing strips 7 for the inclined surfaces 15 and 16 of the rings 5 and 6, respectively, are held on to the rings in any suitable manner, such as by headed copper pins, at 22, which are adapted to be inserted through the lining strips 7, at intervals longitudinally thereof, and into prepared recesses into which the ends of the pins are adapted to make a driving fit. The axis of the recesses is preferably disposed normal to the inclination of the faces 15 and 16.

The disk 3 is preferably adapted to rotate the flywheel 2 and effects, through the frictional contact had with the flywheel 2, a frictional driving connection therefor. In the embodiment of Fig. 1, the flywheel makes frictional contact with the rings 5 and 6 which are pressed against the flywheel by the effect of springs 19, whereby a frictional driving connection is had between the rings 5 and 6, and the flywheel. These springs are compressed between the end walls 26 and 27 of aligned recesses 28 and 29 in the rings 5 and 6 and the disks 3 and 4 respectively. Pins 30 having a countersunk head 31 are inserted into bores 32 and 33 respectively of the rings and disks to provide a driving connection for the disks and rings.

The operation of my improved vibration damping device will be readily understood by reference to Letters Patent No. 1,085,443, dated Jan. 27, 1914, to Lanchester, and which contains a description of the principle involved in the damping of certain forms of vibration in the running of high-speed multi-cylinder engines, and which principle is involved generically in the device of the present invention.

Figure 3:
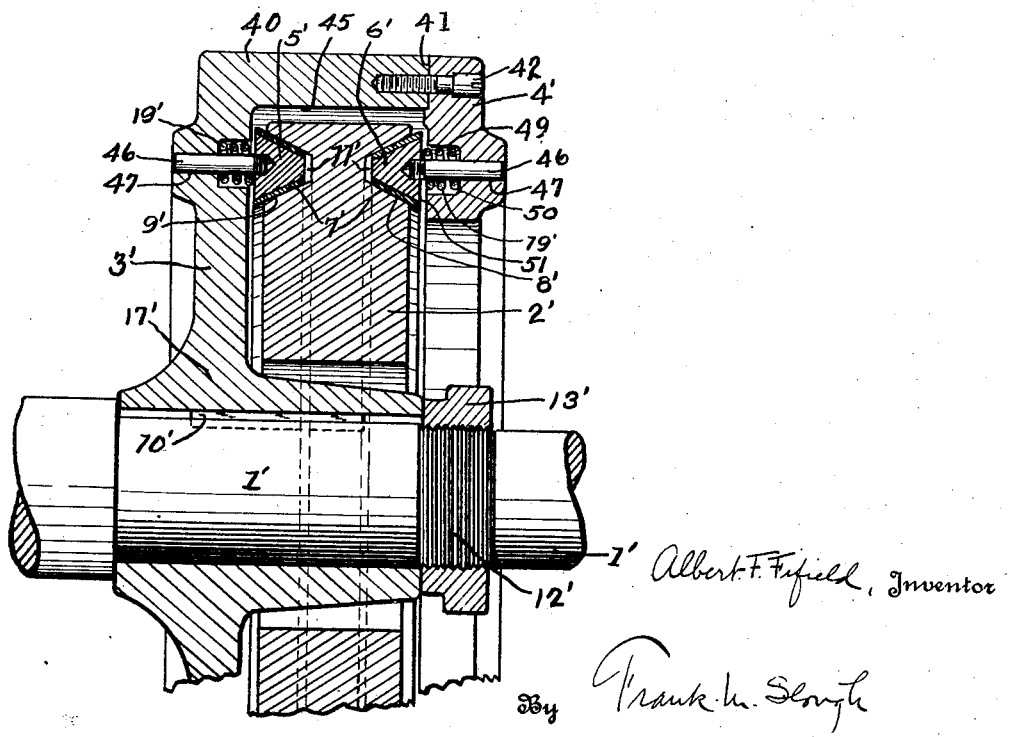
Fig. 3 illustrates a sectional view of a portion of another embodiment of my invention.

In the embodiment of my invention illustrated in Fig. 3, the structure is substantially the same except that in the embodiment of Fig. 3, but a single disk 3' is rigidly and non-rotatably secured, at its hub portion 17', by a key 10' to the shaft 1' and provides a support for the flywheel 2'. The disk 3' is formed with an annular peripheral flange 40, to the end wall 41 of which is secured by screws 42, a ring or disk 4' corresponding to the disk 4 of the embodiment of Fig. 1. The flywheel is disposed in the recess 45 formed by the peripheral flange and the hub. The friction rings for each of these disks, as illustrated at 5' and 6', are supported on a plurality of integral or rigidly secured laterally projecting stems 46 which fit snugly within transverse tubular openings 47 extending through the disks 3' and 4', these being suitably spaced at intervals so as to support the rings 5' and 6' uniformly throughout its length. A compression spring 19' is telescoped over each of the stems 46 and partly recessed in an enlarged portion of the tubular openings or passages 49 of the disk 4', the springs 19' being compressed against the shoulder 50 at the end wall of the enlarged bore portion and the rear face 51 of the friction rings 5' and 6' in each case. In this embodiment, the flywheel 2' is supported out of contact with the crankshaft 1', in the manner of the flywheel 2 of Fig. 1. The rings 5' and 6' are resiliently pressed from the disks 3' and 4', which rotate with the crankshaft and both exert opposing pressures upon their respective rings to spring-press them into driving frictional contact, by their inclined surfaces 7', with the inclined annular walls 8' and 9' of the opposite flywheel faces. The inclined friction surfaces of the flywheel, in the embodiments so far described, are formed by grooving at 11' the opposite faces of the flywheel. A nut 13' is threaded at 12' to the shaft to hold the disk 3' against relative longitudinal movement on the shaft and to facilitate removal therefrom when desired.

In Fig. 1, I have shown, at X dotted lines placed on the drawing of Fig. 1, in order to illustrate further modifications of my invention which might be in some cases advantageously employed. These modifications, which herein we will term as modification "A" and modification "B", comprise, in modification "A", the omission of all parts of the flywheel 2 between the lines X, and in modification "B", the omission of all parts of the flywheel outside the lines X. In both of these modifications, it will be understood that the flywheel will be sufficiently weighted by increasing its thickness, if necessary, to secure the desired inertia effect required to properly dampen the torsional vibrations of the shaft upon which the vibration damping device of such modification may be placed.

Fig. 1, in the first embodiment, is to be taken without any consideration being given the lines X.

Referring to Fig. 5, I show a fragment of a crankshaft 1'' upon which is mounted another embodiment of my invention, preferably comprising a disk 53 having a hub portion 54, non-rotatably secured to the shaft 1'' by a key 55. The disk is provided with an annular flange 56 having inclined walls 57 and 58, with an anti-frictional facing or lining 59 disposed on these inclined walls. The flange 56 is projected into an annular recess 60 in the adjacent side wall 61 of the flywheel. The walls of the recess are inclined inwardly towards each other at 62 and 63 to provide a frictional driving connection between the disk 53 and the flywheel 2''.

A shoulder 64 is formed in the shaft by reducing the same, which reduced portion is threaded at 65. A nut 66 is threaded onto the shaft and is provided with an annular recess 67 formed by an annular peripheral flange 68. A compression spring 69 is compressed between the recess 67 and an annular groove 70 in the side wall of the flywheel and is adapted to retain the flywheel and disk in driving connection with each other.

In the embodiment of Fig. 5, it will be seen that for the plurality of springs 19 and 19' of the first two embodiments, I have substituted a single spring 69, which is as great in individual reactive power as the springs 19 and 19'.

The flywheel is spaced from the shaft by virtue of an enlarged axial bore 72 into which the hub 54 of the disk is telescoped with a clearance space 73 therebetween.

Having thus described my invention as applied to certain embodiments, I am aware that numerous and extensive departures may be made from the embodiments and so-called modifications herein illustrated and described but without departing from the spirit of my invention.

I claim:

1. In a vibration damper, the combination with a rotatable shaft, of a flywheel therefor, a pair of clutch elements in driving relation to the shaft and making frictional contact with th flywheel on annular portions thereof to frictionally drive the same, said flywheel being supported coaxially with the shaft and out of contact therewith by said clutch element, said flywheel having a pair of oppositely disposed lateral annular grooves each with divergent annular walls, and the clutch elements making a wedging driving frictional engagement with the surfaces of said divergent walls of the flywheel.

2. In a vibration dampener, the combination with an engine crankshaft, of a flywheel therefore comprising a heavy annulus provided with an axial bore, said shaft extending axially through the bore of the annulus, a pair of annular clutch elements driven by the shaft disposed at the two opposite lateral sides of the flywheel, each of the clutch elements being non-rotatable relative to the shaft and rotatable therewith, and having a lateral annular surface making frictional pressure engagement with opposite lateral surfaces of the flywheel, at least one of the surfaces in contact being inclined to the plane of rotation of the flywheel, to entirely wedgingly support the flywheel annulus on the clutch elements free of other engagement therewith and with said shaft.

3. In a vibration dampener, the combination with an engine crankshaft, of a flywheel therefor comprising a heavy annulus provided with an axial bore, said shaft extending axially through the bore of the annulus, a pair of annular clutch elements driven by the shaft disposed at the two opposite lateral sides of the flywheel, each of the clutch elements being non-rotatable relative to the shaft and rotatable therewith, and having a lateral annular surface making frictional engagement with a lateral surface of the flywheel inclined to the plane of rotation of the flywheel, means supporting the clutch elements, said means rigidly secured to the shaft and having portions projecting radially therefrom, and disposed adjacent the outer lateral surfaces of the clutch elements, and means resiliently compressed between the clutch elements and the said projecting portions to maintain the clutch elements in pressure frictional contact with the contacted surfaces of the flywheel, the wall of the annulus bore being maintained out of contact with any rotary part of said clutch element supporting means and of said shaft.

4. In a vibration dampener for suppressing torsional vibrations of engine crankshafts, a flywheel in the form of an annulus telescoped over the shaft and co-axially disposed relative thereto, a pair of annuluses disposed at opposite sides of the flywheel, means carried by the shaft comprising radially extending projecting portions adapted to support said annuluses and hold them against rotation relative to the shaft, and means associated with said annuluses and projecting portions comprising compression springs exerting continual constant pressure to press the annuluses inwardly against the flywheel to make frictional driving contact therewith, said flywheel having its central bore of such a size as to provide clearance with said shaft and said annulus supporting means.

5. In a vibration dampener for suppressing torsional vibrations of engine crankshafts, a flywheel in the form of an annulus telescoped over the shaft and co-axially disposed relative thereto, a pair of annuluses disposed at opposite sides of the flywheel, means carried by the shaft comprising radially extending projecting portions adapted to support said annuluses and hold them against rotation relative to the shaft, and means associated with said annuluses and projecting portions comprising compression springs exerting continual constant pressure to press the annuluses inwardly against the flywheel to make frictional driving contact therewith, said flywheel having its central bore of such a size as to provide clearance with said shaft and said annulus supporting means said annuluses being of frustro-conical form in all transverse sections, and said flywheel comprising annular grooves into which said frustro-conical portions of the clutch elements are received.

6. In a vibration dampener for suppressing torsional vibrations of engine crankshafts, a flywheel in the form of an annulus telescoped over the shaft and co-axially disposed relative thereto, a pair of annuluses disposed at opposite sides of the flywheel, means carried by the shaft comprising radially extending projecting portions adapted to support said annuluses and hold them against rotation relative to the shaft, and means associated with said annuluses and projecting portions comprising compression springs exerting continual constant pressure to press the annuluses inwardly against the flywheel to make frictional driving contact therewith, said flywheel having its central bore of such a size as to provide clearance with said shaft and said annulus supporting means, said annuluses being of frustro-conical form in all transverse sections, said flywheel comprising annular grooves into which said frustro-conical portions of the clutch elements are received, said grooves in transverse section being substantially frustro-conical in form.

In testimony whereof I hereunto affix my signature this 25th day of April, 1927.

ALBERT FRANK FIFIELD.